Patented Sept. 18, 1951

2,568,141

UNITED STATES PATENT OFFICE 2,568,141

SUBSTITUTED GLYCINAMIDES

William F. Bruce, Havertown, and Joseph Seifter, Willow Grove, Pa., assignors to Wyeth Incorporated, Philadelphia, Pa., a corporation of Delaware No Drawing. Application January 14, 1947, Serial No. 722,069

2 Claims. (Cl. 260—294)

This invention relates to new substituted glycinamides having the general formula $$R'=NCH_2CON=R''$$

where $R'=N$ and $N=R''$ stand for dissimilar heterocyclic secondary amine residues. In both cases N is part of the heterocyclic ring.

We have found, in the preparation and study of a considerable group of new, substituted glycinamides, that a large number of these compounds evidence marked pharmacological actions hitherto unsuspected in the art and which is considered to be highly useful in the medicinal field. Specifically, we have found that when particular amines are used in the preparation of the compounds of our invention, the glycinamide products evidence useful pharmacological action, more specifically described below.

In general, the compounds of the invention may be synthesized by reacting chloracetyl chloride with a heterocyclic compound having the general formula $R''=NH$ where N is part of the ring, to form a chloracetamide intermediate $$ClCH_2CON=R''$$

The latter compound is then reacted with another and dissimilar deterocyclic compound having the formula $R'=NH$ to form the corresponding substituted glycinamide $R'=NCH_2CON=R''$.

Both heterocyclic compounds may be either 5- or 6-member ring compounds containing at least one nitrogen atom in the ring.

As examples of 5-membered rings contemplated by this invention may be mentioned pyrrole, pyrazole, imidazole and triazole. Moreover, the ring may be partially or completely saturated, and as an illustration, pyrroline or pyrrolidine are also contemplated within the scope of the invention. Furthermore, the heterocyclic may contain a fused benzene ring, as for example, in the use of benzotriazole or benzoimidazole.

As examples of 6-membered rings contemplated by this invention may be mentioned morpholine, piperidine and thiamorpholine.

Both 5- and 6-membered rings may be substituted or unsubstituted and in the former case, one or more of the hydrogen atoms may be replaced with an oxy, hydroxy, alkoxy or hydroxyalkyl radical.

Returning to the method of synthesis, the preferred method for the preparation of the chloracetamide involves the reaction of chloracetyl chloride with the appropriate heterocyclic secondary amine in the presence of benzene or ether as a solvent for the reactants. Heating may or may not be necessary depending on the speed of the reaction. The chloracetamide remains in solution in the solvent and may be isolated by distilling off the solvent under reduced pressure. In general, a molar ratio of chloride to heterocyclic of about 1:2 is used.

The reaction of the appropriate chloracetamide and the appropriate heterocyclic secondary amine to form the desired substituted glycinamide is preferably operated with a molar ratio, amide to amine of about 1:1 and is carried out in the presence of a solvent for the reactants such as higher alcohols having 4 to 7 carbon atoms in the molecule, dioxane or hydrocarbon solvents such as xylene. The amount of solvent used is so selected as to not only dissolve the reactants but to have sufficient for refluxing. The reaction is carried out in the presence of an acid acceptor or mildly basic material such as alkali or alkaline earth metal carbonates, sodium bicarbonate or alkali metal alcoholates, and preferably about 2 to 3 mols of this material is used. The reaction operation is set up for refluxing and the reaction temperature is the refluxing temperature of the particular solvent selected. Generally, a reaction or refluxing time of about 10–15 hours is sufficient for complete reaction. In the event that solids are formed, these are removed by filtration, the substituted glycinamide product remaining in solution in the solvent. The latter is finally removed by distillation at low pressures to obtain the desired product.

The new compounds have valuable physiological properties and are useful in that they possess at least one of the following actions: local anesthetic, pressor, spasmolytic, analgesic, sedative and convulsant.

Proceeding to a better understanding of the invention, illustrative specific procedures for the preparation of representative 5- and 6-membered heterocyclic glycinamides falling within the general formula are set forth in the following examples.

EXAMPLE I

*Preparation of benzotriazolyl aceto piperidide*

In order to prepare the glycinamide, the first step involves the preparation of the appropriate chloracetamide N-a-chloracetyl piperidine.

A solution of 88 cc. (131 grams) of chloracetyl chloride in diethyl ether was added dropwise to a solution of 200 grams of piperidine (230 cc.) dissolved in 3000 cc. of diethyl ether, the temperature being maintained at 10–20° C. The piperidine hydrochloride was filtered off, the ether evaporated and the oil distilled at 166-169° C. under a vacuum of 55 mm. The yield of N-a-chloracetyl piperidine amounted to 11.5 grams.

A solution of 10 grams of N-a-chloracetyl piperidine and 7.5 grams of benzotriazole in 40 cc. of n-butanol together with 14 grams of sodium carbonate was refluxed for 12 hours. The solids were filtered off and the filtrate concentrated in vacuo and distilled. The product was a solid with a melting point of 198-191° C. The yield of benzotriazolyl aceto piperidide was 10.5 grams.

EXAMPLE II

*Preparation of piperidino aceto 1-benzotriazol*

For the preparation of the appropriate chloracetamide N-a-chloracetobenzotriazol, 22 grams of benzotriazole in 100 cc. of benzene was added to a solution of 10 grams of chloracetyl chloride in 100 cc. of benzene. The reaction mixture was digested on a hot plate for 3 hours and after cooling was filtered off. The filtrate on concentration yielded a solid product melting at 92-94° C. The yield of N-a-chloracetobenzotriazol was 18 grams.

A solution of 9 grams of N-a-chloraceto-benzotriazol and 4 grams of piperidine in 25 cc. of n-butanol together with 10 grams of sodium carbonate was refluxed for 12 hours. The solids were removed by filtration and the filtrate concentrated in vacuo and distilled. The product boiled at 113-115° C. at a pressure of 5 mm. The yield of piperidino aceto 1-benzotriazol was 5 grams.

EXAMPLE III

*Preparation of piperidino aceto morpholide*

For the preparation of the appropriate chloracetamide N-a-chloracetomorpholine, a solution of 35 grams (0.4 mols) of morpholine in 100 cc. of benzene was added slowly with stirring to a solution of 23 grams (0.2 mol) of chloracetyl chloride in 100 cc. of benzene. After cooling, the precipitate of morpholine hydrochloride was collected on a filter and the filtrate was concentrated in vacuo. The product distilled from 152-160° C. at a pressure of 6 mm. and was a colorless viscous oil. The yield of N-a-chloracetomorpholine was 35 grams.

A solution of 10 grams of N-a-chloracetomorpholine and 6 grams of piperidine in 40 cc. of n-butanol together with 14 grams of sodium carbonate was refluxed for 12 hours. The solids were filtered off and the filtrate was concentrated in vacuo and distilled. The product boiled at 138-140° C. at a pressure of 3 mm. The yield of piperidino aceto morpholide was 8.2 grams.

Substantially all of the products of the invention are high boiling basic liquids or solids of limited solubility when in their unsubstituted form. It is contemplated that while the products may be used in the basic form, it is within the scope of the invention that they may be prepared and used in the forms of their acid-addition salts. The preparation of an acid-addition salt is well-known and generally involves the addition of the selected acid to an ether or alcohol solution of the basic material. The acid is chosen to yield a salt which is known to those skilled in the art as being physiologically non-toxic. As examples, the hydrochloride, sulfate or acetate salts of the products may be used.

It is further contemplated that those substituted glycinamides which are less soluble in dilute acid than 0.5% by weight, or the non-toxic salts thereof, may be brought into satisfactory solution by use of solubilizing, surface-active, emulsifying or detergent agents in order to obtain a more complete physiological effect of the specific substituted glycinamide. Lipoid solvents having a physiologically non-toxic effect such as long-chain fatty acid partial esters of hexitol anhydrides or oxyalkylene derivatives thereof, as an example, sorbitan monolaurate or derivatives thereof, vegetable and animal oils and ointment bases such as cholesterol or petroleum jelly are examples of solvents that have been found useful in admixture with the substituted glycinamides for obtaining an enhanced physiological effect. If solubilizing agents are undesirable in large amounts, it has been found that hydroxy and alkoxy substituents for hydrogen on the ring and/or on a radical attached to the ring results in increasing the solubility of the insoluble compounds.

Many modifications of the invention will be apparent to those skilled in the art without departure therefrom or from the scope of the claims, and since the foregoing disclosure has been given by way of example for clearness and understanding only, no unnecessary limitations to the description and the claims should be implied.

We claim:
1. The new compound, piperidino aceto 1-benzotriazol.
2. As new compounds, glycinamides having the general formula

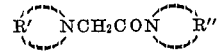

wherein

stands for a 6-membered heterocyclic nucleus selected from the group consisting of a piperidine, a morpholine and a thiamorpholine nucleus while

stands for a 5-membered heterocyclic nucleus of the group consisting of a pyrrole, a pyrazole, an imidazole and a triazole nucleus; and the acid-addition salts thereof.

WILLIAM F. BRUCE.
JOSEPH SEIFTER.

REFERENCES CITED

The following references are of record in the file of this patent:

UNITED STATES PATENTS

| Number | Name | Date |
| --- | --- | --- |
| 2,139,190 | Iselin et al. | Dec. 6, 1938 |
| 2,230,774 | Bockmuhl | Feb. 4, 1941 |
| 2,278,123 | Heyn | Mar. 31, 1942 |
| 2,288,197 | Kranzlein et al. | June 30, 1942 |
| 2,295,655 | Hentrict et al. | Sept. 15, 1942 |
| 2,332,075 | Gustus | Oct. 19, 1943 |
| 2,407,703 | Kaplan | Sept. 17, 1946 |

FOREIGN PATENTS

| Number | Country | Date |
| --- | --- | --- |
| 483,324 | Great Britain | Apr. 19, 1938 |

OTHER REFERENCES

Svensk Kemisk Tidskrift, 49 172 (1937).